(12) United States Patent
Zak et al.

(10) Patent No.: US 10,859,179 B2
(45) Date of Patent: Dec. 8, 2020

(54) SERVOVALVE

(71) Applicant: Hamilton Sundstrand Corporation, Charlotte, NC (US)

(72) Inventors: Maciej Zak, Wroclaw (PL); Marek Jedliński, Wroclaw (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/286,761

(22) Filed: Feb. 27, 2019

(65) Prior Publication Data

US 2019/0277423 A1   Sep. 12, 2019

(30) Foreign Application Priority Data

Mar. 8, 2018   (EP) .................................. 18461530

(51) Int. Cl.
| | | |
|---|---|---|
| *H02K 26/00* | (2006.01) | |
| *F16K 31/06* | (2006.01) | |
| *F16K 31/124* | (2006.01) | |
| *F15B 13/043* | (2006.01) | |

(52) U.S. Cl.
CPC ........ *F16K 31/124* (2013.01); *F15B 13/0438* (2013.01); *F16K 31/0627* (2013.01); *H02K 26/00* (2013.01); *Y10T 137/87209* (2015.04)

(58) Field of Classification Search
CPC ............... F16K 31/124; F16K 31/0627; F15B 13/0438; H02K 26/00; Y10T 137/87209
USPC .................................. 137/596.16; 251/129.11
See application file for complete search history.

(56) References Cited

U.S. PATENT DOCUMENTS

| | | | | |
|---|---|---|---|---|
| 2,823,689 | A | * | 2/1958 | Healy ................. F15B 13/0438 137/82 |
| 2,996,072 | A | | 8/1961 | Atchley |
| 3,221,760 | A | * | 12/1965 | Buchanan ........... F15B 13/0438 137/82 |
| 3,366,132 | A | | 1/1968 | Fore |
| 3,498,308 | A | | 3/1970 | Miller, Jr. et al. |
| 3,616,727 | A | | 11/1971 | Suzuki et al. |

(Continued)

FOREIGN PATENT DOCUMENTS

FR   2689200 A1   10/1993

OTHER PUBLICATIONS

Extended European Search Report for International Application No. 18461530.0 dated Sep. 21, 2018, 8 pages.

*Primary Examiner* — William M McCalister
(74) *Attorney, Agent, or Firm* — Cantor Colburn LLP (57) ABSTRACT

A torsion bridge for use in a servovalve includes a body extending along and adapted to rotate about a first axis; a passage extending through the body along a second axis substantially perpendicular to the first axis, the passage defining a first cylindrical surface having a radius $R_1$; an annular groove formed in the first cylindrical surface. The annular groove includes: a second cylindrical surface extending substantially in the direction of the second axis, the second cylindrical surface having first and second ends and a radius $R_2$, where $R_2$ is greater than $R_1$; a first annular surface joining the first cylindrical surface to the first end of the second cylindrical surface; and a second annular surface joining the second end of the second cylindrical surface to the first cylindrical surface.

14 Claims, 4 Drawing Sheets

(56) References Cited

U.S. PATENT DOCUMENTS

| | | | |
|---|---|---|---|
| 3,712,339 A * | 1/1973 | Bartholomaus | F15B 13/0438 137/625.62 |
| 3,749,129 A | 7/1973 | Amdur | |
| 3,833,017 A * | 9/1974 | Gordon | F15B 5/003 137/625.62 |
| 3,934,816 A * | 1/1976 | Terrell | F16K 31/406 251/129.08 |
| 4,013,264 A * | 3/1977 | Friedell | F16K 5/061 251/56 |
| 4,362,182 A * | 12/1982 | Sjolund | F15B 13/0438 137/625.64 |
| 4,378,031 A * | 3/1983 | Nicholson | F15B 13/0436 137/625.63 |
| 5,070,898 A * | 12/1991 | Jagodzinski | F15B 13/043 137/82 |
| 5,184,645 A * | 2/1993 | Boerschig | F15C 3/14 137/625.25 |
| 5,465,757 A * | 11/1995 | Peters | F15B 13/0438 137/625.65 |
| 5,499,650 A * | 3/1996 | McArthur | G05D 16/2024 137/85 |
| 7,172,169 B2 * | 2/2007 | Biester | F16H 25/20 251/129.11 |
| 7,631,663 B2 * | 12/2009 | Rauch | F15B 13/0438 137/625.62 |
| 8,733,398 B2 * | 5/2014 | Henson | F01D 21/00 123/198 DB |
| 8,967,179 B2 * | 3/2015 | Ozzello | F15B 13/0436 137/625.61 |
| 9,328,839 B2 * | 5/2016 | Arend | F16K 31/0679 |
| 9,574,676 B2 * | 2/2017 | Laboda | H01F 7/121 |
| 9,644,645 B2 * | 5/2017 | Ozzello | F15B 9/06 |
| 9,897,116 B2 * | 2/2018 | Ozzello | F15B 13/0436 |
| 2016/0049230 A1 * | 2/2016 | Cichon | H01F 7/021 251/30.01 |
| 2018/0138789 A1 * | 5/2018 | Zak | F15B 13/0438 |
| 2019/0093725 A1 * | 3/2019 | Cis | F16F 1/16 |

\* cited by examiner

SERVOVALVE

FOREIGN PRIORITY

This application claims priority to European Patent Application No. 18461530.0 filed Mar. 8, 2018, the entire contents of which is incorporated herein by reference.

TECHNICAL FIELD

The present disclosure relates to servovalves and to torsion bridges and seal assemblies therefor.

BACKGROUND

Servovalves are typically used to control air or other fluid flow to effect driving or control of another part, e.g. an actuator.

A servovalve typically comprises a first subsystem comprising a torque motor which acts as a driver to a second subsystem. The second subsystem may contain a fluid such as fuel, hydraulic fluid or pneumatic fluid and comprises a valve mechanism which may control flow of the fluid. In one example, the fluid can be a hydraulic fluid and the torque motor may operate to position a moveable member, such as a flapper, in response to an input drive signal or control current, to drive the valve mechanism. The valve mechanism may in turn control flow of the hydraulic fluid to an actuator for driving a load.

The second subsystem may be sealed to avoid leakage of the fluid therefrom, which would have a detrimental effect on both safety and performance. It is known to seal the second subsystem by providing an O-ring seal between a chimney of the body of the second subsystem and the flapper. This requires a groove for receiving the O-ring to be provided within the chimney. The relatively long, narrow dimensions of the chimney provide the challenges of small component parts, tight tolerances and restricted access to control the quality of the groove. Designers are being challenged to provide a seal for a servovalve which is quicker, less expensive and less complex to produce.

The present disclosure seeks to address these challenges.

SUMMARY

According to an aspect of the present disclosure there is provided a torsion bridge for use in a servovalve. The torsion bridge includes: a body extending along and adapted to rotate about a first axis; a passage extending through the body along a second axis substantially perpendicular to the first axis, the passage defining a first cylindrical surface having a radius $R_1$; and an annular groove formed in the first cylindrical surface. The annular groove includes: a second cylindrical surface extending in the direction of the second axis, the second cylindrical surface having first and second ends and a radius $R_2$, where $R_2$ is greater than $R_1$; a first annular surface joining the first cylindrical surface to the first end of the second cylindrical surface; and a second annular surface joining the second end of the second cylindrical surface to the first cylindrical surface.

Thus it will be seen by those skilled in the art that, in accordance with the present disclosure, the torsion bridge includes an annular groove formed within a passage therein which may in use receive an O-ring. The dimensions of the torsion bridge and the passage are such as to allow the annular groove to be formed in a relatively cost and time effective manner. Access to the cylindrical passage to check that the dimensions and surface roughness of the groove are within required manufacturing tolerances is also relatively easy to achieve.

The first and/or second annular surfaces may act to hold an O-ring within the annular groove in use. Thus, in any example of the present disclosure, the first and/or second annular surfaces may extend at an angle of between 45° and +45° to the first axis. Preferably however, in any example of the present disclosure, the first and/or second surfaces may extend at an angle of between −15° and +15° to the first axis.

In any example of the present disclosure, the annular groove of the torsion bridge may further comprise smooth curved surfaces joining the first annular surface to the second cylindrical surface and the second cylindrical surface to the second annular surface. The provision of the smooth curved surfaces may reduce potential damage or wear to an O-ring positioned in the annular groove in use.

In any example of the present disclosure, the passage may comprise smooth curved surfaces joining the first cylindrical surface to the first annular surface and joining the second annular surface to the first cylindrical surface. The provision of the smooth curved surfaces may again reduce potential damage or wear to an O-ring in use or during insertion into the annular groove in use.

The torsion bridge according to the present disclosure may be used in a servovalve. During assembly of the servovalve, an O-ring may be inserted into the annular groove of the torsion bridge via the passage. A chamfered surface may be provided at one end of the passage to allow for easier insertion of the O-ring. In any example of the present disclosure therefore, the passage may further comprise a chamfered portion, the chamfered portion being provided at one axial end of the first cylindrical surface and comprising: a first end joined to the first cylindrical surface and having a radius $R_1$; and a second end joining an outer surface of the body and having a radius $R_3$, wherein $R_3$ is greater than $R_1$.

In any example of the present disclosure, the passage may comprise a smooth curved surface joining the first end of the chamfered portion to the first cylindrical surface and the second end of the chamfered surface to the outer surface of the body. This again may reduce potential damage or wear to an O-ring during insertion into the annular groove in use.

In any example of the present disclosure, $R_3$ may be greater than or equal to $R_2$. Thus, the radius of the O-ring, which in some examples is approximately equal to the radius of the annular groove, may fit into the open end of the chamfered portion relatively easily.

As discussed above, the torsion bridge according to the present disclosure is for use in a servovalve. A servovalve is also described herein that includes: a moveable member; a torsion bridge (262) extending along and adapted to rotate about a first axis ($A_r$) and having a passage therethrough; a valve system comprising a body containing a fluid, the body having a hollow chimney extending axially in a first direction therefrom, the hollow chimney having an open end; and a torque motor for rotating the torsion bridge to control the valve system by moving the moveable member. The moveable member extends into the body through the hollow chimney, the hollow chimney extends into the passage in the torsion bridge, and a seal is provided between the hollow chimney and the passage.

Various types of moveable member could be provided depending on the type of servovalve. Thus, the servovalve might be a jet-type servovalve and the moveable member might be a nozzle of the jet pipe. In any example of the present disclosure however, the moveable member may be a flapper.

To avoid leakage of fluid from the body of the valve system, a sealed space can be provided around the open end of the hollow chimney. In one example, this could be achieved by a fluid tight connection between the moveable member and a surface of the torsion bridge together with the seal between the hollow chimney and the passage. In any example of the present disclosure, the servovalve may further comprise an armature plate located axially beyond the torsion bridge in the first direction, the armature plate having a passage therethrough, and the moveable member may comprise a flange, wherein the moveable member extends through the passage in the armature plate and a fluid tight connection is formed between the flange and a surface of the armature plate.

Although the hollow chimney could take various shapes, in any example of the present disclosure the hollow chimney may be cylindrical.

Various types of seal could be envisaged such as, for example, a foam seal. In any example of the present disclosure however, the seal may comprise an O-ring.

In any example of the present disclosure, an annular groove may be formed in the passage and the O-ring may be provided in the annular groove. This will allow the O-ring to be held within the annular groove. As the torsion bridge will move with the moveable member, relative movement between different surfaces which come into contact with the O-ring may be avoided or limited. Thus, wear or damage to the O-ring due to twisting or stretching may be reduced.

In any example of the present disclosure, the passage may define a first cylindrical surface having a radius $R_1$, and the annular groove may comprise: a second cylindrical surface extending substantially parallel to the first cylindrical surface, the second cylindrical surface having first and second ends and a radius $R_2$, where $R_2$ is greater than $R_1$; a first annular surface joining the first cylindrical surface to the first end of the second cylindrical surface; and a second annular surface joining the second end of the second cylindrical surface to the first cylindrical surface.

In any example of the present disclosure, the first and/or second surfaces may extend at an angle of between −45° and +45° to the first axis.

In any example of the present disclosure, the first and/or second surfaces may extend at an angle of between −15° and +15° to the first axis.

In any example of the present disclosure, the annular groove may further comprise smooth curved surfaces joining the first annular surface to the second cylindrical surface and the second cylindrical surface to the second annular surface.

In any example of the present disclosure, the passage may comprise smooth curved surfaces joining the first cylindrical surface to the first annular surface and joining the second annular surface to the first cylindrical surface.

In any example of the present disclosure, the passage may further comprise a chamfered portion provided at one axial end of the first cylindrical surface and comprising: a first end joined to the first cylindrical surface and having a radius $R_1$; and a second end joining an outer surface of the body and having a radius $R_3$, wherein $R_3$ is greater than $R_1$.

In any example of the present disclosure, $R_3$ may be greater than or equal to $R_2$.

A method of manufacturing a servovalve is also described herein. The servovalve includes: a valve system having a chimney; and a torsion bridge and the method comprising: forming an annular groove in a passage through the torsion bridge; inserting an O-ring into the annular groove; and inserting the chimney into the passage such that the O-ring forms a seal between a surface of the chimney and the annular groove.

In any example of the present disclosure, the method may further comprise: prior to inserting the O-ring into the annular groove, inserting a plug into the annular groove; applying a nickel plating to the torsion bridge; removing the plug from the annular groove; and brazing the torsion bridge to an armature plate of the servovalve.

In any example of the present disclosure, the method may further comprise: checking the dimensions of the annular groove against required tolerances prior to inserting the O-ring therein.

In any example of the present disclosure, the method may further comprise: using a microscope to check the surface roughness of the annular groove against required tolerances prior to inserting the O-ring therein.

Features of any example described herein may, wherever appropriate, be applied to any other examples of the present disclosure. Where reference is made to different examples, it should be understood that these are not necessarily distinct but may overlap.

BRIEF DESCRIPTION OF THE FIGURES

One or more non-limiting examples will now be described, by way of example only, with reference to the accompanying drawings, in which:

FIG. 3b is a cross-sectional view of the torsion bridge of FIG. 3a.

DETAILED DESCRIPTION

Figure 1:
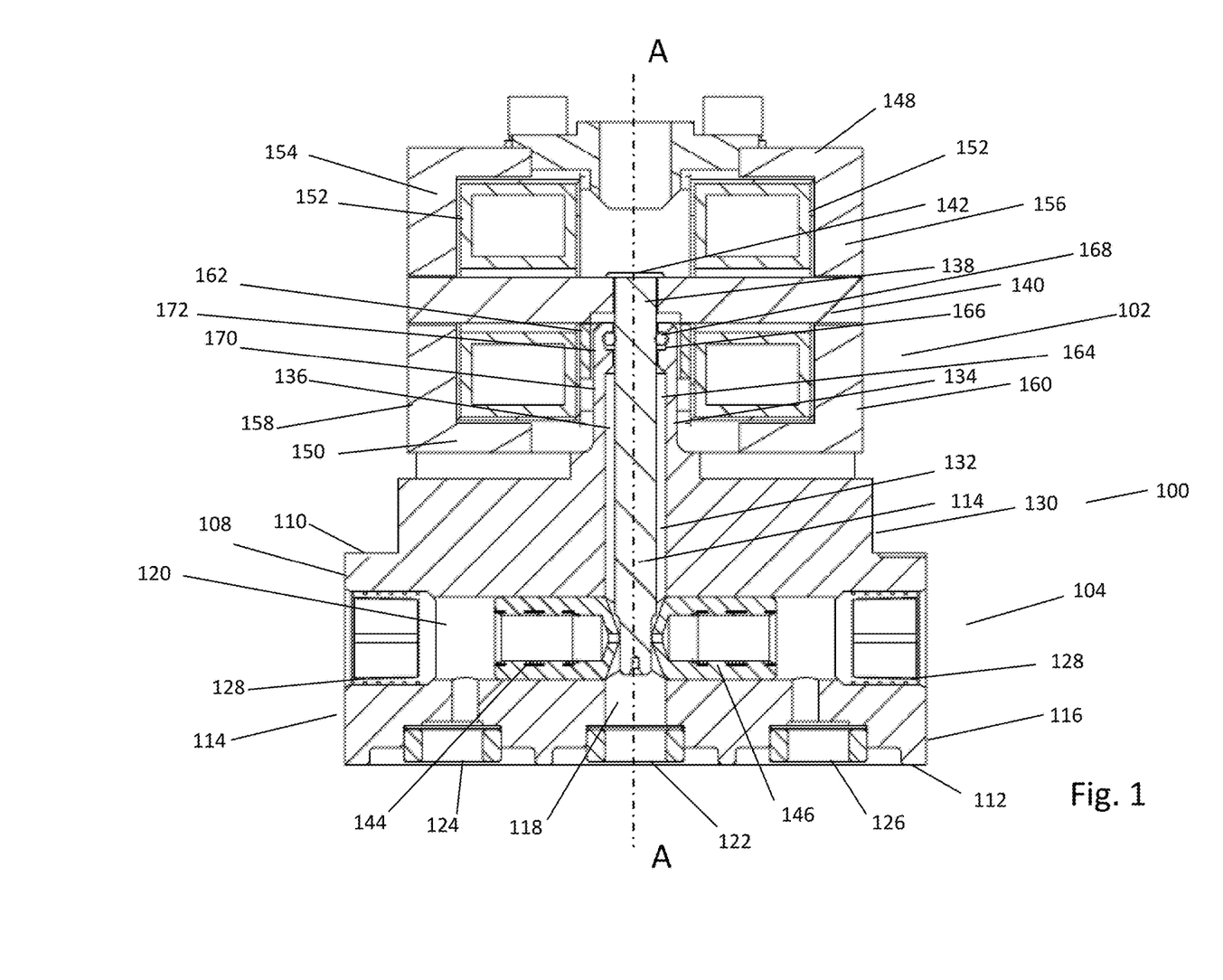
FIG. 1 is a cross-sectional view of a servovalve according to an example which does not fall within the scope of the claims.
Figure 2A:
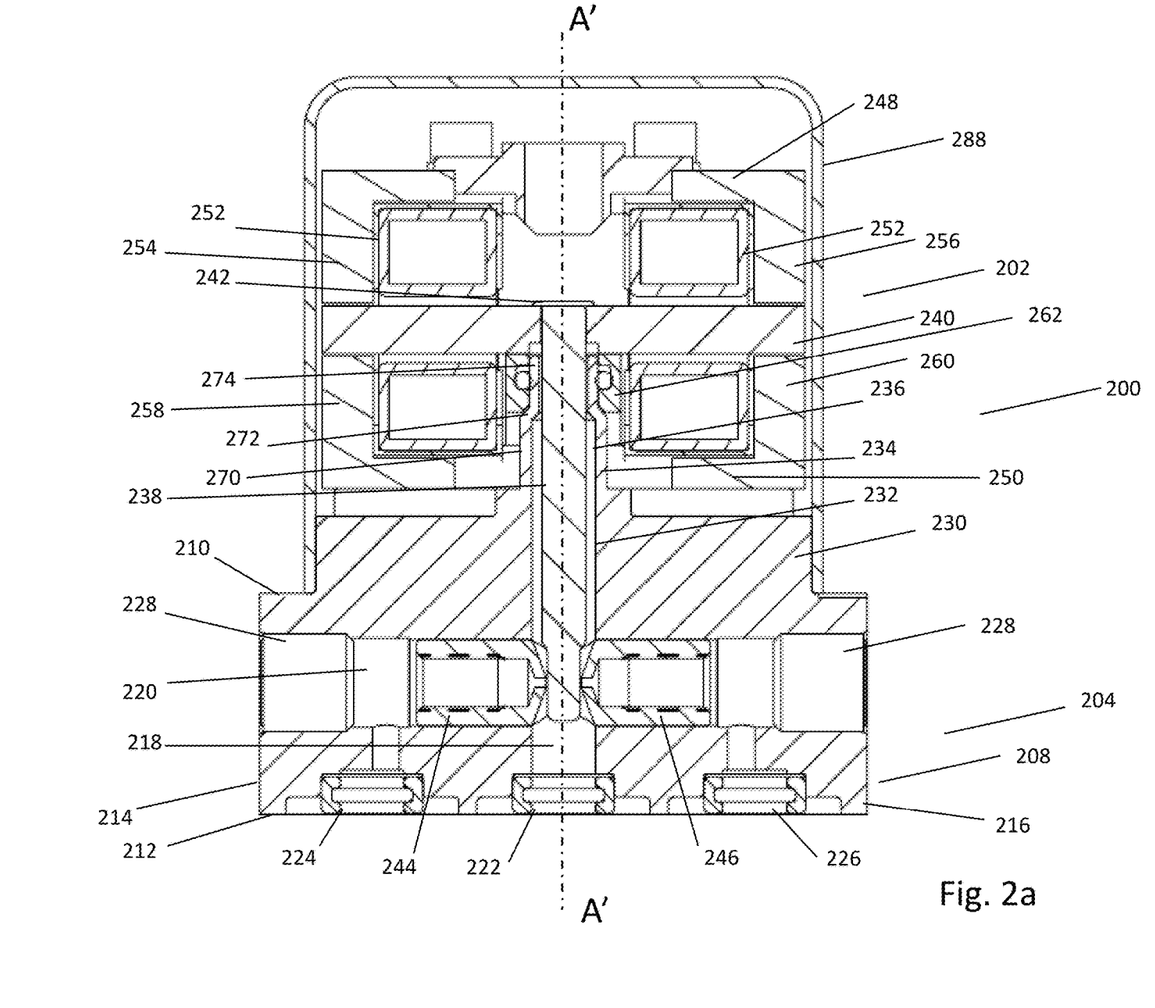
FIG. 2a is a cross-sectional view of a servovalve according to an example of the present disclosure along a first plane through the centre thereof.
Figure 2B:
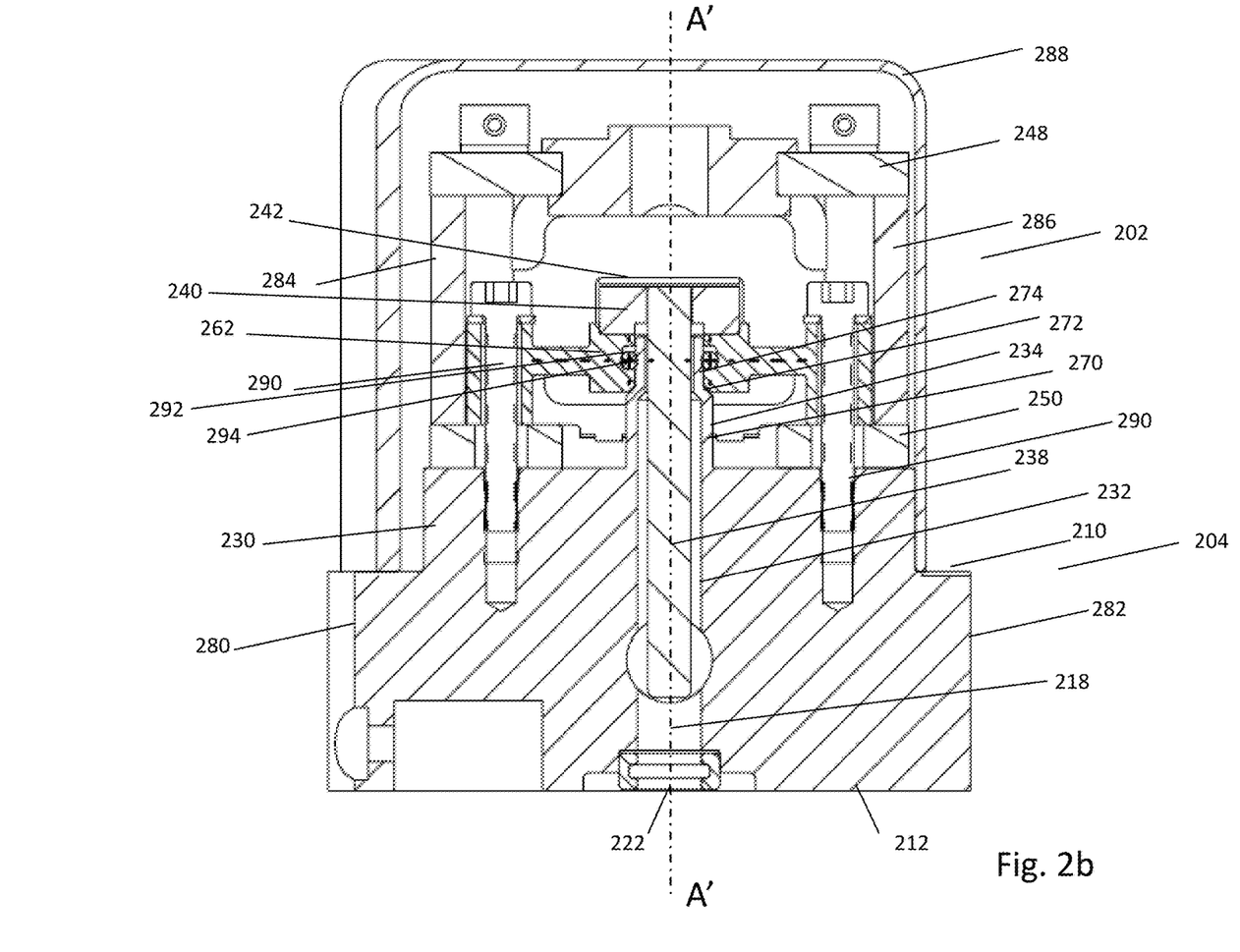
FIG. 2b is a cross-sectional view of the servovalve of FIG. 2a along a second plane through the centre thereof and perpendicular to the first plane.

As is known in the art, a servovalve is a device used for regulating either the flow rate or pressure gain at the receiving end of a system, i.e. some kind of actuator. It is controlled by a power signal supplied to the coils of a torque motor. For reference, an example of one type of servovalve is depicted in FIG. 1. The new torsion bridge and seal assembly described herein may be used with the type of servovalve shown in FIG. 1, as illustrated in FIGS. 2a and 2b and described below, but is not limited to this, and may also be used with other types of servovalves. The servovalve depicted in FIG. 1 and FIGS. 2a and 2b is therefore one example of a servovalve with which the new torsion bridge and seal assembly as described later and shown in FIGS. 2a and 2b, 3a and 3b can be used.

FIG. 1 shows a cross section through a servovalve 100 comprising a first subsystem 102 for driving a second subsystem 104 containing a fluid such as hydraulic fluid, fuel or pneumatic fluid. In the example shown, the fluid is hydraulic fluid. The first subsystem 102 comprises a torque motor. The servovalve 100 is assembled about a longitudinal axis A as shown in FIG. 1.

The second subsystem 104 comprises a box shaped body 108 having a first square planar surface 110 centred on the longitudinal axis A, a second square planar surface 112, which forms the base of the box shaped body 108, centred on the longitudinal axis A and separated from the first square planar surface 110 in a first axial direction, and first to fourth side walls joining the first and second square planar surfaces 110, 112, wherein the first side wall 114 is opposite the second side wall 116 and the third and fourth side walls are not shown.

A first cylindrical passage 118 extends through the box shaped body 108 along the longitudinal axis A. A second cylindrical passage 120 extends from the first side wall 114 to the second side wall 116 and intersects the first cylindrical passage 118 perpendicular thereto. A control port 122 is provided in the second square planar surface 112 and extends axially in line with the first cylindrical passage 118. A supply port 124 is provided in the base of the box shaped body 108 to one side of the control port 122 and extends from the base parallel to the first cylindrical passage 118 to join with the second cylindrical passage 120. A return port 126 is also provided in the base of the box shaped body 108 to the other side of the control port 122 and again extends from the base parallel to the first cylindrical passage 118 to join with the second cylindrical passage 120. Lee plugs 128 are provided at either end of the second cylindrical passage 120 adjacent the respective first and second side walls 114, 116 to seal the second cylindrical passage 120 from the external environment.

The second subsystem 104 further comprises a cylindrical body 130 which is formed integrally with the box shaped body 108. The cylindrical body 130 is centred on the longitudinal axis A, has a radius which is less than the distance from the longitudinal axis A to the first side wall 114, and extends in a second axial direction from the first square planar surface 110 such that a first circular end of the cylindrical body 130 is integral with the first square planar surface 110. The cylindrical body 130 comprises a third cylindrical passage 132 which forms an extension of the first cylindrical passage 118 and extends from the first circular end of the cylindrical body 130 to the other circular end thereof.

A hollow cylindrical chimney 134 (having an external radius of approximately 20% the radius of the cylindrical body 130) is formed integrally with the cylindrical body 130 and extends in the second axial direction therefrom so as to form a fourth cylindrical passage 136 which is coaxial and continuous with the third cylindrical passage 132.

The second subsystem 104 further comprises a flapper 138 which is cylindrical in shape, and an armature plate 140 which is substantially rectangular in cross section. The armature plate 140 is mounted such that in its resting position, the longitudinal axis (not shown) thereof extends perpendicular to the longitudinal axis A and parallel to the second cylindrical passage 120. The flapper 138 extends along the longitudinal axis A, through the centre of the armature plate 140 and through the fourth cylindrical passage 136 and the third cylindrical passage 132. The flapper 138 comprises a circular flange 142 at a first end thereof. The flange 142 is fixed to a surface of the armature plate 140 so as to join the flapper 138 to the armature plate 140. When the torque motor is not activated and the armature plate 140 is in its resting position, the flapper 138 extends into the first cylindrical passage 118 and is in line with the control port 122. Nozzles 144, 146 are provided in the second cylindrical passage 120 on either side of the flapper 138. Nozzle 144 is located between the control port 122 and the supply port 124. Nozzle 146 is located between the control port 122 and the return port 126. With the flapper 138 in its resting position, the flapper 138 abuts against the nozzle 146 such that the nozzle 144 is open and fluid in the second subsystem 104 flows from the supply port 124 to the control port 122 and the return port 126.

The first subsystem 102 comprises a torque motor having a first annular pole piece 148, centred on the longitudinal axis A and arranged parallel to the armature plate 140 and spaced therefrom in the second axial direction, and a second annular pole piece 150 arranged parallel to the armature plate 140 and spaced therefrom in the first axial direction. The first subsystem 102 further comprises coils 152 wrapped around the armature plate 140 on either side and spaced from the centre thereof. The first annular pole piece 148 comprises first and second flange elements 154, 156 extending over diametrically opposite first and second portions of the outer circumference thereof adjacent the coils 152, and extending in the first axial direction from the first annular pole piece 148 towards the armature plate 140. The second annular pole piece 150 comprises first and second flange elements 158, 160 extending over diametrically opposite first and second portions of the outer circumference thereof adjacent the coils 152, and extending in the second axial direction from the second annular pole piece 150 towards the armature plate 140. Permanent magnets (not shown) are also provided on opposite sides of the armature plate 140. The coils 152 are connected via lead wires (not shown) to a source of electricity (not shown) to thereby provide an electrical current to the coils 152.

The torque motor is an electromagnetic circuit such that in operation, current flowing through the coils 152 creates an electromagnetic force acting on the armature plate 140. The armature plate 140 is fixed to and supported on a torsion bridge 162 which extends perpendicular to the longitudinal axis A and the longitudinal axis of the armature plate 140. The torsion bridge 162 twists when torque is applied to it and so the torsion bridge 162, armature plate 140 and flapper 138 rotate due to the current flowing through the coils 152.

This rotation changes the position of the end of the flapper 138, moving it towards the supply port 124 such that the flapper 138 abuts against the nozzle 144. In this position, the supply port 124 is closed and fluid within the second subsystem 104 will flow from the control port 122 to the return port 126.

Both to ensure safety and for good operation of the servovalve, it is important that the second subsystem 104 is sealed against leakage of fluid therefrom. It is known to achieve a seal using an O-ring to seal between the surface of the fourth cylindrical passage 136 and the flapper 138. As seen in FIG. 1, the hollow cylindrical chimney 134 comprises a first portion 170 extending from the cylindrical body 130 in which the diameter of the fourth cylindrical passage 136 is greater than the diameter of the flapper 138 such that an annular gap 164 is formed between the flapper 138 and the wall of the fourth cylindrical passage 136. The hollow cylindrical chimney 134 further comprises a second portion 172 extending axially from the first portion 170 in which the diameter of the fourth cylindrical passage 136 is narrower than in the first portion 170, such that the gap between the flapper 138 and the wall of the fourth cylindrical passage 136 is reduced in the second portion 172 of the hollow cylindrical chimney 134. An annular groove 166 is formed in the wall of the second portion 172 of the hollow cylindrical chimney 134 to receive an O-ring 168 therein.

In the servovalve shown in FIG. 1, the relatively small dimensions lead to relatively time consuming and expensive manufacturing processes.

In order to manufacture a servovalve according to the example of FIG. 1, the annular groove 166 must be machined in the hollow cylindrical chimney 134. This is a relatively time consuming and expensive process due to the narrow diameter of the chimney 134 making access thereto relatively difficult.

Additionally, the surface of the annular groove 166 must be smooth in order to avoid damage to the O-ring 168. Consequently, the surface roughness of the grooves in manufactured components must be monitored for quality control. Due to the dimensions of the hollow cylindrical chimney 134, access to the annular groove 166 for the measurement of surface roughness is only practically possible by cutting the body of the second subsystem 104 in half. It has therefore been usual practice to monitor the surface roughness of the annular grooves by cutting the first body produced in each series or lot in half and retaining these as evidence of quality. This leads to waste and a corresponding increase in cost of the manufactured parts.

In addition to the above, where parts are to be connected together by brazing, a nickel plating must be applied thereto. However, contact between the O-ring and nickel could cause damage to the O-ring. Consequently, it has been necessary to mask parts of the flapper which come into contact with the O-ring prior to nickel plating, this again increasing manufacturing costs.

A new type of torsion bridge for use in a servovalve, a new type of seal assembly for use in a servovalve and a new type of servovalve is now described with reference to FIGS. 2a, 2b, 3a and 3b. FIG. 2a shows a cross section through a servovalve 200 according to an example of the present disclosure. The servovalve 200 comprises a first subsystem 202 for driving a second subsystem 204 containing a fluid such as hydraulic fluid, fuel or pneumatic fluid. In the example shown, the fluid is hydraulic fluid. A nominal operating pressure within the second subsystem may be up to 500 psi, with a maximum operating pressure of 1500 psi. The servovalve 200 is assembled about a longitudinal axis A as shown in FIGS. 2a and 2b.

The second subsystem 204 or valve system comprises an aluminium box shaped body 208 which is the same as the box shaped body 108 shown in FIG. 1. As seen in FIGS. 2a and 2b, the box shaped body 208 has first and second side walls 214, 216 arranged opposite each other and third and fourth side walls 280, 282 arranged opposite each other and extending between the first and second side walls 214, 216. The box shaped body 208 further comprises a first square planar surface 210 and a second square planar surface 212 joined together by the side walls 214, 216, 280, 282.

As in the example of FIG. 1, a first cylindrical passage 218 extends through the box shaped body 208 along the longitudinal axis A'. A second cylindrical passage 220 extends from the first side wall 214 to the second side wall 216 and intersects the first cylindrical passage 218 perpendicular thereto. A control port 222 is provided in the second square planar surface 212 and extends axially in line with the first cylindrical passage 218. A supply port 224 is provided in the base of the box shaped body 208 to one side of the control port 222 and extends from the base parallel to the first cylindrical passage 218 to join with the second cylindrical passage 220. A return port 226 is also provided in the base of the box shaped body 208 to the other side of the control port 222 and again extends from the base parallel to the first cylindrical passage 218 to join with the second cylindrical passage 220. Lee plugs 228 are provided at either end of the second cylindrical passage 220 adjacent the respective first and second side walls 214, 216 to seal the second cylindrical passage 220 from the external environment.

The second subsystem 204 further comprises an aluminium cylindrical body 230 which is formed integrally with the box shaped body 208. The cylindrical body 230 is centred on the longitudinal axis A', has a radius which is less than the distance from the longitudinal axis A' to the first side wall 214, and extends in a second axial direction from the first square planar surface 210 such that a first circular end of the cylindrical body 230 is integral with the first square planar surface 210. The cylindrical body 230 comprises a third cylindrical passage 232 which forms an extension of the first cylindrical passage 218 and extends from the first circular end of the cylindrical body 230 to the other circular end thereof.

A hollow cylindrical chimney 234 is formed from aluminium and is integral with the cylindrical body 230 and extends in the second axial direction therefrom so as to form a fourth cylindrical passage 236 which is coaxial and continuous with the third cylindrical passage 232.

The hollow cylindrical chimney 234 comprises a first portion 270 having axially extending walls extending from the cylindrical body 230 and having a first internal diameter $d_{1i}$ and a first external diameter $d_{1e}$. A second portion 272, the walls of which extend at an angle to the longitudinal axis A', joins the first portion 270 to a third portion 274, the third portion having a second internal diameter $d_{2i}$ and a second external diameter $d_{2e}$ and the walls of the third portion extending parallel to the longitudinal axis A'. The first internal diameter $d_{1i}$ is greater than the second internal diameter $d_{2i}$ and the first external diameter $d_{1e}$ is greater than the second external diameter $d_{2e}$. It will be appreciated therefore that the radius of the fourth cylindrical passage 236 varies along the axial extent thereof.

The second subsystem 204 further comprises a moveable member, more specifically a flapper 238 which is cylindrical in shape and is formed from austenitic stainless steel, and an armature plate 240 which is substantially rectangular in cross section. The armature plate 240 is mounted such that in its resting position, the longitudinal axis thereof (not shown) extends perpendicular to the longitudinal axis A' and parallel to the second cylindrical passage 220. The flapper 238 extends along the longitudinal axis A', through the centre of the armature plate 240 and through the fourth cylindrical passage 236 and the third cylindrical passage 232. The flapper 238 comprises a circular flange 242 at a first end thereof. The flange 242 is fixed to a surface of the armature plate 240 so as to provide a fluid tight seal. In one example, the flange 242 is fixed to the armature plate 240 by brazing. In its resting position when the torque motor is not activated and the armature plate 240 is in its resting position, the flapper 238 extends into the first cylindrical passage 218 and is in line with the control port 222. Nozzles 244, 246 are provided in the second cylindrical passage 220 on either side of the flapper 238. With the flapper 238 in its resting position, fluid in the second subsystem 204 flows from the supply port 224 to the control port 222 and the return port 226.

The first subsystem 202 comprises a housing 288 which extends axially from the first square planar surface 210 so as to surround and cover the first subsystem 202. The first subsystem 202 further comprises a torque motor having a first annular pole piece 248, centred on the longitudinal axis A' and arranged parallel to and axially spaced from the armature plate 240 of the second subsystem 204 so as to be spaced therefrom in the second axial direction, and a second annular pole piece 250 arranged parallel to and below the armature plate 240 so as to be spaced therefrom in the first axial direction. The first subsystem 202 further comprises coils 252 wrapped around the armature plate 240 on either side and spaced from the centre thereof. The first annular pole piece 248 comprises first and second flange elements 254, 256 extending over diametrically opposite first and second portions of the outer circumference thereof adjacent the coils 252, and extending in the first axial direction from the first annular pole piece 248 towards the armature plate 240. The second annular pole piece 250 comprises first and second flange elements 258, 260 extending over diametrically opposite first and second portions of the outer circumference thereof adjacent the coils 252, and extending in the second axial direction from the second annular pole piece 250 towards the armature plate 240. Permanent magnets 284, 286 are also provided on opposite sides of the armature plate 240 and extend axially between the first and second annular pole pieces 248, 250. The coils 152 are connected via lead wires (not shown) to a source of electricity (not shown) to thereby provide an electrical current to the coils 152.

The torque motor is an electromagnetic circuit such that in operation, current flowing through the coils 252 creates an electromagnetic force acting on the armature plate 240. The armature plate 240 is fixed to and supported on a torsion bridge 262 which extends perpendicular to the longitudinal axis A' and perpendicular to the longitudinal axis of the armature plate 240. The torsion bridge can be formed of austenitic stainless steel.

The torsion bridge 262 twists when torque is applied to it in use and so the torsion bridge 262, armature plate 240 and flapper 238 rotate due to the current flowing through the coils 252. This rotation changes the position of the end of the flapper 238, moving it towards the supply port 224 such that the flapper 238 abuts against the nozzle 244. In this position, the supply port 224 is closed and fluid within the second subsystem 204 will flow from the control port 222 to the return port 226.

Figure 3A:
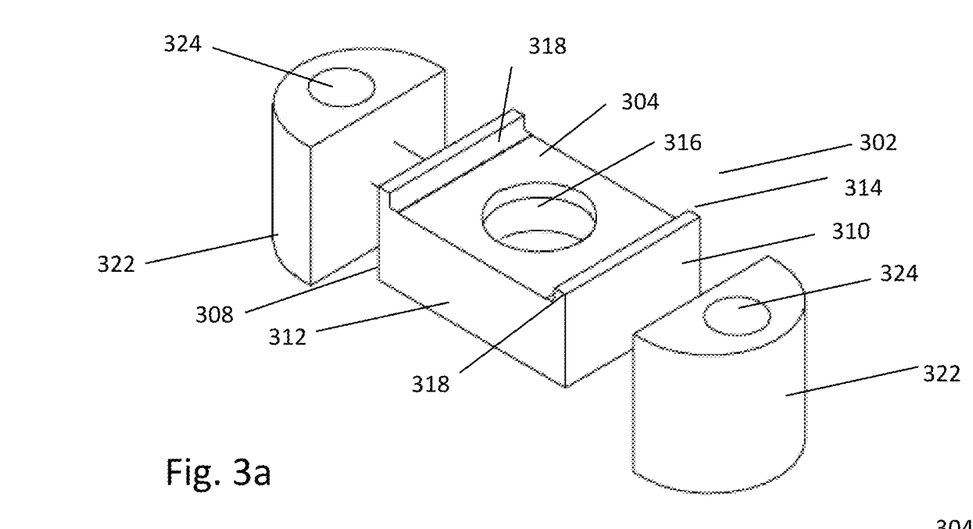
FIG. 3a is a perspective view of a torsion bridge according to an example of the present disclosure.
Figure 3B:
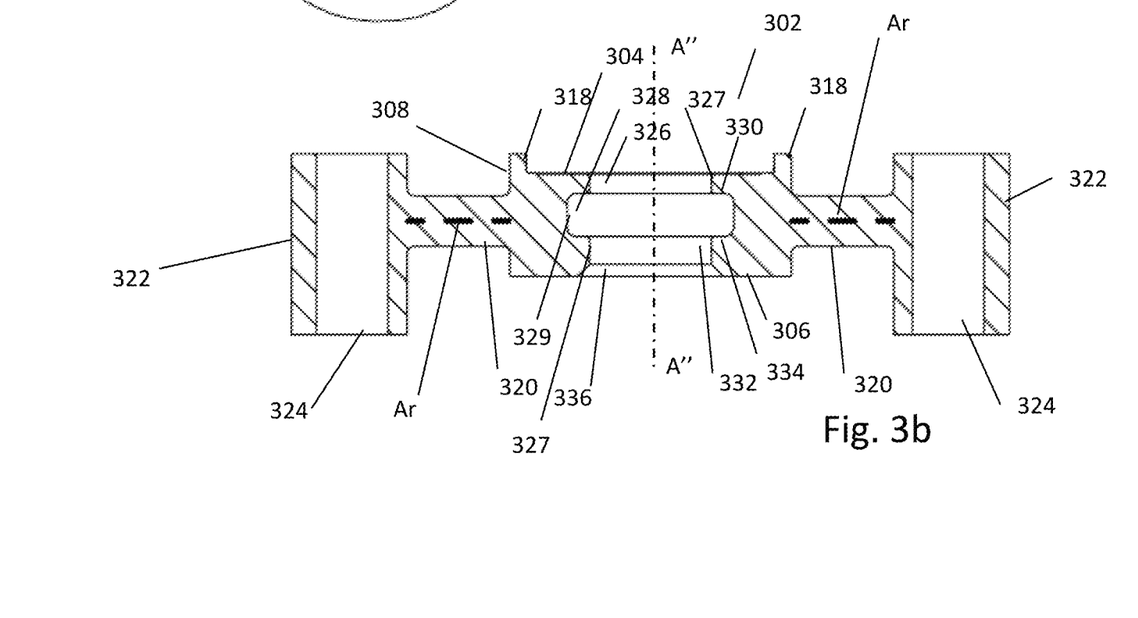

The torsion bridge 262 of the example of FIGS. 2a and 2b is shown in further detail in FIGS. 3a and 3b. The torsion bridge 262 comprises a body having a box shaped central portion 302 having a substantially rectangular cross section. The box shaped central portion 302 has a first square planar surface 304 centred on a central axis A", a second square planar surface 306, which forms the base thereof, centred on the central axis A" and separated from the first square planar surface 304 in a first axial direction, and first to fourth side walls joining the first and second square planar surfaces 304, 306, wherein the first side wall 308 is opposite the second side wall 310 and the third side wall 312 is opposite the fourth side 314, the third and fourth side walls 312, 314 extending between the first and second side walls 308, 310.

A cylindrical passage 316 extends through the central portion 302 from the first square planar surface 304 to the second square planar surface 306 centred on the central axis A". First and second flanges 318 extend from the first square planar surface 304 of the central portion 302 to form a continuation of the respective first and second side walls 308, 310. The flanges 318 act to hold the armature plate 240 in place by abutting against the edges thereof when the servovalve is assembled as shown in FIG. 2b.

First and second cylindrical torsion shafts 320 extend outwardly from the midpoint of the respective first and second side walls 308, 310 in a direction perpendicular to the central axis A". Solid bodies 322 having a cylindrical passage 324 extending therethrough in a direction parallel to the central axis A" are provided at the outer end of each torsion shaft 320. Anchoring means 290 (shown in FIG. 2b) extend through the cylindrical passages 324 and engage with the cylindrical body 230 of the second subsystem 204 when the servovalve 200 is assembled so as to fix the solid bodies 322 relative to the second subsystem 204. As seen in FIG. 3b, the torsion shafts 320 extend in a direction perpendicular to the central axis A" along an axis of rotation $A_r$. The torsion bridge will twist about the axis of rotation $A_r$.

When the servovalve is assembled, the third portion 274 of the chimney 234 extends within the cylindrical passage 316 of the central portion 302 of the torsion bridge 262. The armature plate 240 rests on and extends across the torsion bridge 262 within the flanges 318. A direct connection is formed between the first square planar surface 304 of central portion 302 of the torsion bridge 262 and the surface of the armature plate in contact therewith. In various examples, this connection could be formed by brazing, gluing or welding. The flapper 238 then extends through the centre of the armature plate 240 and through the cylindrical hollow chimney 234.

As discussed above, it is important that the second subsystem 204 is sealed against leakage of fluid therefrom both to ensure safety and for good operation of the servovalve. As can be seen for example in FIG. 2a, in use fluid will be present in the first cylindrical passage 218, the second cylindrical passage 220, the third cylindrical passage 232 and the hollow cylindrical chimney 234. In the servovalve of the present disclosure, a seal is provided between the torsion bridge 262 and the hollow cylindrical chimney 234. More particularly, an annular groove 292 for receiving an O-ring 294 is formed in the cylindrical passage 316 of the central portion 302 of the torsion bridge 262. It will be appreciated that fluid may also be present in the space between the flapper 238 and the armature plate 240 and in the space between the armature plate 240, the hollow cylindrical chimney 234, the torsion bridge 262 and the O-ring 294.

The annular groove 292 is seen in further detail in FIG. 3b. As shown, the cylindrical passage 316 in the central portion 302 of the torsion bridge 262 comprises a first portion 326 extending from the first square planar surface 304 towards the second square planar surface 306. The walls of the first portion 326 have a first constant radius $R_1$ and define a first cylindrical surface 327. A second portion 328 (which forms the axially extending walls of the annular groove 292) extends from the first portion towards the second square planar surface 306. The second portion 328 comprises axially extending cylindrical walls which define a second cylindrical surface 329 having a second constant radius $R_2$, where $R_2$ is greater than $R_1$ The second cylindrical surface 329 has first and second axial ends (not shown). A first annular surface 330 extends substantially perpendicular to the central axis A" and joins the cylindrical walls of the first portion 326 to the cylindrical walls of the second portion 328. A third portion 332 extends from the second portion 328 towards the second square planar surface 306, the walls of the third portion 332 having the first constant radius $R_1$. A second annular surface 334 extends substantially perpendicular to the central axis A" and joins the cylindrical walls of the second portion 328 to the cylindrical walls of the third portion 332. Smooth curved surfaces or radii are formed between each of the first portion 326 and the first annular surface 330, the first annular surface 330 and the second portion 328, the second portion 328 and the second annular surface 334, and the second annular surface 334 and the third portion 332. This reduces the risk of damage or wear to the O-ring 294 when in situ. A fourth portion 336 extends from the third portion 332 to the second square planar surface 306. The walls of the fourth portion 336 of the passage 316 are chamfered such that the radius thereof increases steadily from the first radius $R_1$ where they join the third portion 332, to the second radius $R_2$ where they join the second square planar surface 306. This allows for ease of insertion of the O-ring 294 into the annular groove 292 during assembly.

To manufacture the servovalve of FIGS. 2a and 2b, the annular groove 292 can be formed in the cylindrical passage 316, for example by machining. The annular groove 292 can then be measured and/or viewed under a microscope to verify that the dimensions and/or surface roughness thereof are within required tolerance ranges.

If the required tolerances are met, a plug (not shown) can then be inserted into the annular groove before applying a nickel plating to the torsion bridge 262 (and especially the first square planar surface 304 of the central portion 302 thereof). The plug (not shown) can then be removed before brazing the torsion bridge 262 to the armature plate 240. Finally, an O-ring is inserted into the annular groove and the chimney is then inserted into the passage so as to assemble to the servovalve.

As seen in FIGS. 2a and 2b, when the servovalve 200 is assembled, the O-ring 294 is held within the annular groove 292 and forms a seal between the outer surface of the third portion 274 of the hollow cylindrical chimney 234 and the cylindrical passage 316 of the torsion bridge 262. As the O-ring 294 contacts integral parts of the torsion bridge 262 (i.e., the first annular wall 330, the second annular surface 334 and the second portion 328) on three of its four contact surfaces, twisting of the O-ring and possible consequent damage thereto are reduced. Further, the first and second annular surfaces 330, 334 may support the O-ring 294 during normal variations in operating pressure. The cylindrical walls of the second portion 328 support the O-ring against the flapper 238.

As seen most clearly in FIG. 2b, when in situ, the O-ring 294 is in axial alignment with the axis of rotation $A_r$ of the torsion shafts 320. Thus, the O-ring is provided at the same height (i.e. the same level on the longitudinal axis A') as the axis of rotation $A_r$. This provides static sealing and avoids twisting of the O-ring 294 when the torsion shafts 320 rotate. This therefore protects the O-ring as twisting of the O-ring 294 could result in damage thereto or could cause the seal created by the O-ring 294 to be broken.

It will be appreciated that the diameter of the O-ring 294 of the example of FIGS. 2a and 2b is greater than the diameter of the O-ring 168 of the known example of FIG. 1. In some examples, this can have the advantage that the larger O-ring will have larger manufacturing tolerances and will be cheaper and easier to produce. A larger O-ring will also normally have a longer lifetime.

It will be understood that the diameter of the annular groove 292 in the torsion bridge 262 is significantly greater than the diameter of the annular groove of the known example of FIG. 1 such that the manufacturing tolerances therefore can be relaxed compared to the known example of FIG. 1. In addition, the torsion bridge 262 is a relatively shallow component such that access to the cylindrical passage 316 therein is relatively good and the annular groove 292 is relatively more time and cost effective to produce than the in the known example of FIG. 1.

Further, due to the dimensions of the torsion bridge 262, after production the annular groove can be accessed to measure the dimensions and surface roughness thereof. Further, the annular groove 292 can be viewed under a microscope to check for scratches (which could damage the O-ring) thereon. Thus, at least in some examples, there is no need to cut manufactured pieces for access to the groove and so quality control can be carried out on each torsion bridge produced without any waste.

The dimensions of the torsion bridge 262 and the annular groove 292 together with the chamfered fourth portion 336 may lead to a simpler assembly process with greater ease of insertion of the O-ring 294 into the annular groove 292 and less risk of damage thereto.

Where nickel plating is required, for example because elements are to be joined together by brazing, the cylindrical passage 316 of the torsion bridge and/or the annular groove 292 can be masked using a plug.

It will be appreciated by those skilled in the art that the present disclosure has been illustrated by describing one or more specific examples thereof, but is not limited to these examples; many variations and modifications are possible, within the scope of the accompanying claims.

The invention claimed is:

1. A servovalve comprising:
   a moveable member;
   a torsion bridge extending along and adapted to rotate about a first axis and having a passage therethrough;
   a valve system comprising a body containing a fluid, the body having a hollow chimney extending axially in a first direction therefrom, the hollow chimney having an open end; and
   a torque motor for rotating the torsion bridge to control the valve system by moving the moveable member,
   wherein the moveable member extends into the body through the hollow chimney,
   the hollow chimney extends into the passage in the torsion bridge, and
   a seal is provided between the hollow chimney and the passage.

2. A servovalve as claimed in claim 1, wherein the seal comprises an O-ring.

3. A servovalve as claimed in claim 2, wherein an annular groove is formed in the passage and the O-ring is provided in the annular groove.

4. A servovalve as claimed in claim 3, wherein the passage defines a first cylindrical surface having a radius $R_1$, and the annular groove comprises:
   a second cylindrical surface extending substantially parallel to the first cylindrical surface, the second cylindrical surface having first and second ends and a radius $R_2$, where $R_2$ is greater than R1;
   a first annular surface joining the first cylindrical surface to the first end of the second cylindrical surface; and
   a second annular surface joining the second end of the second cylindrical surface to the first cylindrical surface.

5. A servovalve as claimed in claim 4, wherein the first and/or second annular surfaces extend at an angle of between −45° and +45° to the first axis.

6. A servovalve as claimed in claim 5, wherein the first and/or second annular surfaces extend at an angle of between −15° and +15° to the first axis.

7. A servovalve as claimed in claim 6, wherein the annular groove further comprises smooth curved surfaces joining the first annular surface to the second cylindrical surface and the second cylindrical surface to the second annular surface.

8. A servovalve as claimed in claim 7, wherein the passage comprises smooth curved surfaces joining the first cylindrical surface to the first annular surface and joining the second annular surface to the first cylindrical surface.

9. A servovalve as claimed in claim 7, wherein the passage further comprises a chamfered portion provided at one axial end of the first cylindrical surface, the chamfered portion comprising:
   a first end joined to the first cylindrical surface and having a radius $R_1$; and
   a second end joining an outer surface of the body and having a radius $R_3$, wherein $R_3$ is greater than $R_1$.

10. A as claimed in claim 9, wherein $R_3$ is greater than or equal to $R_2$.

11. A method of manufacturing a servovalve, the servovalve comprising:
   a valve system having a chimney; and
   a torsion bridge having a passage extending therethrough, the method comprising:
   forming an annular groove in the passage;
   inserting an O-ring into the annular groove; and
   inserting the chimney into the passage such that the O-ring forms a seal between a surface of the chimney and the annular groove.

12. A method as claimed in claim 11, further comprising:
   prior to inserting the O-ring into the annular groove, inserting a plug into the annular groove;
   applying a nickel plating to the torsion bridge;
   removing the plug from the annular groove; and
   brazing the torsion bridge to an armature plate of the servovalve.

13. A method as claimed in claim 12, further comprising:
   checking the dimensions of the annular groove against required tolerances prior to inserting the O-ring therein.

14. A method as claimed in claim 13, further comprising:
   using a microscope to check the surface roughness of the annular groove against required tolerances prior to inserting the O-ring therein.

* * * * *